US011325715B2

(12) United States Patent
Deforet et al.

(10) Patent No.: US 11,325,715 B2
(45) Date of Patent: May 10, 2022

(54) LINKING DEVICE CONNECTING AN AIRCRAFT ENGINE AND A PRIMARY STRUCTURE OF AN AIRCRAFT PYLON COMPRISING A SPREADER AND A SYSTEM FOR LIMITING THE OUT-OF-PLANE DEFLECTION OF THE SPREADER, AIRCRAFT COMPRISING SUCH A LINKING DEVICE

(71) Applicant: Airbus Operations SAS, Toulouse (FR)

(72) Inventors: Thomas Deforet, Toulouse (FR); Rémi Lansiaux, Toulouse (FR); Olivier Dubois, Castelginest (FR); Anthony Mertes, Albi (FR); David Alric, Saint-Lys (FR); Stéphane Nogues, Lombez (FR)

(73) Assignee: AIRBUS OPERATIONS SAS, Toulouse (FR)

( * ) Notice: Subject to any disclaimer, the term of this patent is extended or adjusted under 35 U.S.C. 154(b) by 270 days.

(21) Appl. No.: 16/807,351

(22) Filed: Mar. 3, 2020

(65) Prior Publication Data
US 2020/0346771 A1    Nov. 5, 2020

(30) Foreign Application Priority Data
May 3, 2019 (FR) ...................................... 1902219

(51) Int. Cl.
*B64D 27/26* (2006.01)
(52) U.S. Cl.
CPC ........ *B64D 27/26* (2013.01); *B64D 2027/268* (2013.01)

(58) Field of Classification Search
CPC .............. B64D 27/26; B64D 2027/268; B64D 2027/266; B64D 27/18
See application file for complete search history.

(56) References Cited

U.S. PATENT DOCUMENTS

| 5,320,307 A * | 6/1994 | Spofford ................ B64D 27/26 244/54 |
| 2001/0025902 A1* | 10/2001 | Jule ........................ B64D 27/18 244/54 |
| 2011/0259997 A1* | 10/2011 | Marechal ............... B64D 27/26 244/54 |
| 2018/0281980 A1* | 10/2018 | Riviere .................. B64D 27/26 |

OTHER PUBLICATIONS

French Search Report; priority document.

* cited by examiner

*Primary Examiner* — Richard R. Green
*Assistant Examiner* — Steven J Shur
(74) *Attorney, Agent, or Firm* — Greer, Burns & Crain, Ltd.

(57) ABSTRACT

A linking device connecting an aircraft engine and a primary structure of an aircraft pylon, comprising a support connected to the primary structure, a spreader, extending between first and second ends that has a central part connected to the support by a principal link comprising a principal rotation axis, at least one system for limiting the deflection of the spreader comprising an extension secured to the spreader and also upper and lower stops, secured to a fitting secured to the support, between which the extension is positioned.

12 Claims, 4 Drawing Sheets

LINKING DEVICE CONNECTING AN AIRCRAFT ENGINE AND A PRIMARY STRUCTURE OF AN AIRCRAFT PYLON COMPRISING A SPREADER AND A SYSTEM FOR LIMITING THE OUT-OF-PLANE DEFLECTION OF THE SPREADER, AIRCRAFT COMPRISING SUCH A LINKING DEVICE

CROSS-REFERENCES TO RELATED APPLICATIONS

This application claims the benefit of the French patent application No. 1902219 filed on Mar. 5, 2019, the entire disclosures of which are incorporated herein by way of reference.

FIELD OF THE INVENTION

The present application relates to a linking device connecting an aircraft engine and a primary structure of an aircraft pylon, comprising a spreader and a system for limiting the out-of-plane deflection of the spreader, and also to an aircraft comprising such a linking device.

BACKGROUND OF THE INVENTION

According to one embodiment that can be seen in FIGS. 1 and 2, an aircraft 10 comprises a plurality of propulsion units 12 positioned under each of the wings 14 of the aircraft. Each propulsion unit 12 comprises an engine 16, a nacelle (not shown in FIG. 2) positioned around the engine 16 and a pylon 18 connecting the engine 16 and the wing 14. The pylon 18 comprises a primary structure 20 that is connected to the engine 16 by an engine attachment 22 and to the wing 14 by a wing attachment 24.

The engine attachment 22 comprises a front engine attachment 26, a rear engine attachment 28 and a pair of thrust rods 30, 30' that take up the thrust forces.

According to one embodiment that can be seen in FIG. 3, each thrust rod 30, 30' comprises a rear end 30.1, 30.1' connected to the primary structure 20 by a linking device 32 and a front end connected to the engine 16.

The linking device 32 comprises:
a support 34, secured to the primary structure 20, having a principal yoke 36,
a spreader 38 connected to the principal yoke 36 by a principal link 40 having a principal rotation axis positioned in a vertical plane.

Each rear end 30.1, 30.1' of the thrust rods 30, 30' is connected to one of the ends of the spreader 38 by a secondary link 42, 42' having a secondary rotation axis positioned in a vertical plane.

The thrust rods 30, 30', the secondary links 42, 42', the spreader 38, the principal link 40 and the support 34 define two primary thrust paths between the engine 16 and the primary structure 20.

The linking device 32 also comprises two fittings 44, 44', one for each thrust rod 30, 30', secured to the support 34, arranged on either side of the principal yoke 36 and connected to the thrust rods 30, 30' by secondary pivoting links 42, 42'. The fittings 44, 44' define two secondary thrust paths that offset any failure of one of the primary thrust paths.

This configuration leads to a significant coupling between the normal modes of the primary thrust paths and the engine frequencies. In certain circumstances, this coupling may lead to the rupture of one of the primary thrust paths.

The present invention is aimed at remedying all or some of the prior-art drawbacks.

SUMMARY OF THE INVENTION

To that end, a subject of the invention is a linking device connecting an aircraft engine and a primary structure of an aircraft pylon, comprising:
a support connected to the primary structure,
a spreader, extending between first and second ends, that has a central part connected to the support by a principal link comprising a principal rotation axis,
a first thrust rod comprising a first end connected to the first end of the spreader by a first secondary link and a second end connected to the engine,
a second thrust rod comprising a first end connected to the second end of the spreader by a second secondary link and a second end connected to the engine,
first and second fittings, secured to the support, comprising upper and lower branches, between which the spreader is positioned,
the linking device generating a deflection of the spreader that can pivot about a deflection rotation axis perpendicular to the principal rotation axis and contained in a plane of symmetry passing via the principal rotation axis.

According to the invention, the linking device comprises at least one system for limiting the deflection of the spreader comprising an extension secured to the spreader and also upper and lower stops, secured to the first or second fitting, between which the extension is positioned.

Each system for limiting the deflection makes it possible to enhance the out-of-plane rigidity of the spreader and to obtain a decoupling of certain natural modes of the primary thrust paths and of the engine frequencies.

According to another feature, the system for limiting the deflection of the spreader is configured such that a sum of the distances between the upper stop and the extension and also between the lower stop and the extension is less than or equal to 0.3 mm.

According to another feature, the linking device comprises first and second systems for limiting the deflection of the spreader which are secured, respectively, to the first and second fittings.

According to another feature, each upper or lower stop comprises a contact face against which the extension is able to bear, at least one of the contact faces comprising a shock-absorbing covering.

According to a first embodiment, for each system for limiting the deflection, the upper and lower stops are out-of-joint with the fitting and each device for limiting the deflection comprises a plate, fixed to the fitting, to which the upper and lower stops are connected.

According to this first embodiment, the upper stop comprises a first flange placed against an exterior face of the upper branch of the fitting and the lower stop comprises a second flange configured such as to be placed against an exterior face of the lower branch of the fitting.

According to a second embodiment, for each system for limiting the deflection, the upper and lower stops are out-of-joint with the fitting and independent of one another, the upper stop being connected to the upper branch of the fitting and the lower stop being connected to the lower branch of the fitting.

According to this second embodiment, each upper or lower stop comprises:
a body that has a first face forming a contact face against which the extension is able to bear and a second face, parallel to the first face, placed against an interior face of the upper or lower branch of the fitting, and a flange made as a single piece with the body, placed against a lateral face of the upper or lower branch of the fitting.

According to this second embodiment, the flange comprises a stud interacting with a notch provided at the lateral face of the upper or lower branch of the fitting.

According to a third embodiment, for each system for limiting the deflection, the upper stop is integrated into the upper branch of the fitting and the lower stop is integrated into the lower branch of the fitting.

According to this third embodiment, the upper branch comprises an upper flange, projecting from an interior face of the upper branch, which has an interior face against which the extension is able to bear and the lower branch comprises a lower flange, projecting from an interior face of the lower branch, which has an interior face against which the extension is able to bear.

A further subject of the invention is an aircraft comprising a linking device according to one of the preceding features.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 1:
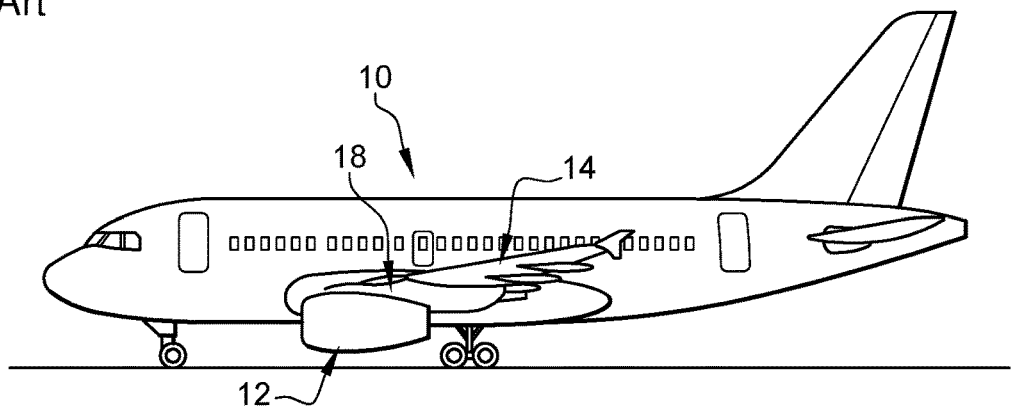
FIG. 1 is a lateral view of an aircraft.
Figure 2:
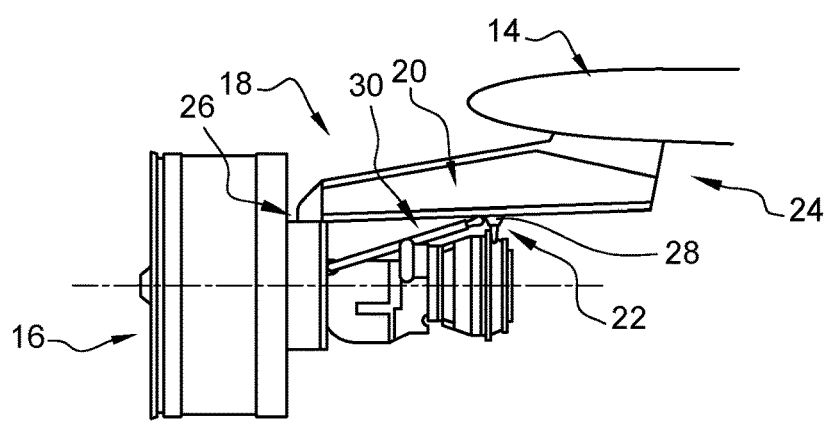
FIG. 2 is a lateral schematic representation of a propulsion unit (the nacelle not being shown)
Figure 3:
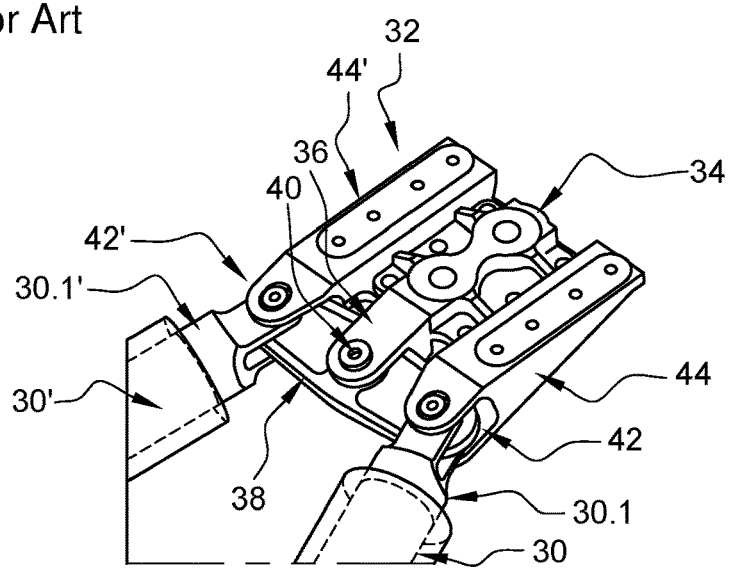
FIG. 3 is a perspective view of a linking device connecting thrust rods and a primary structure of an aircraft pylon, illustrating a prior-art embodiment.
Figure 4:
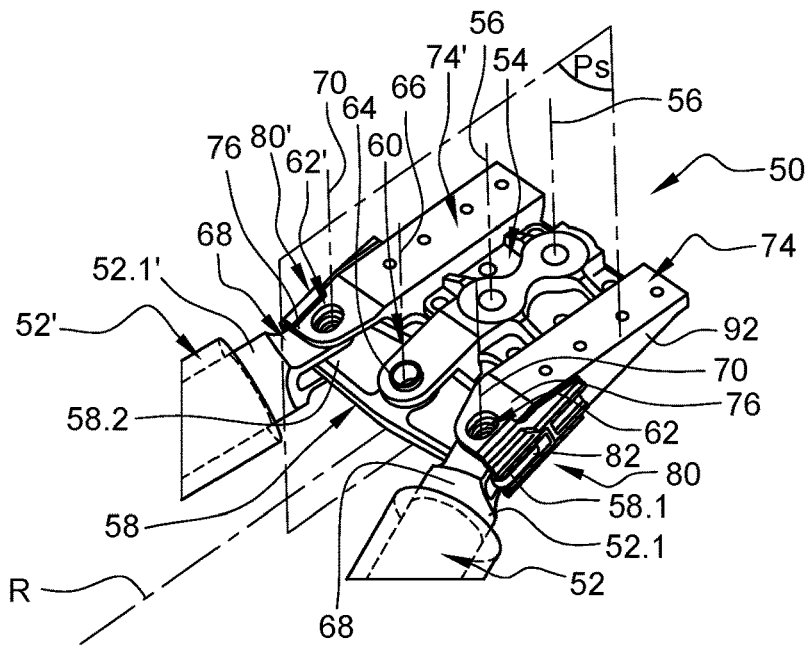
FIG. 4 is a perspective view of a linking device connecting thrust rods and a primary structure of an aircraft pylon, illustrating a first embodiment of the invention.
Figure 7:
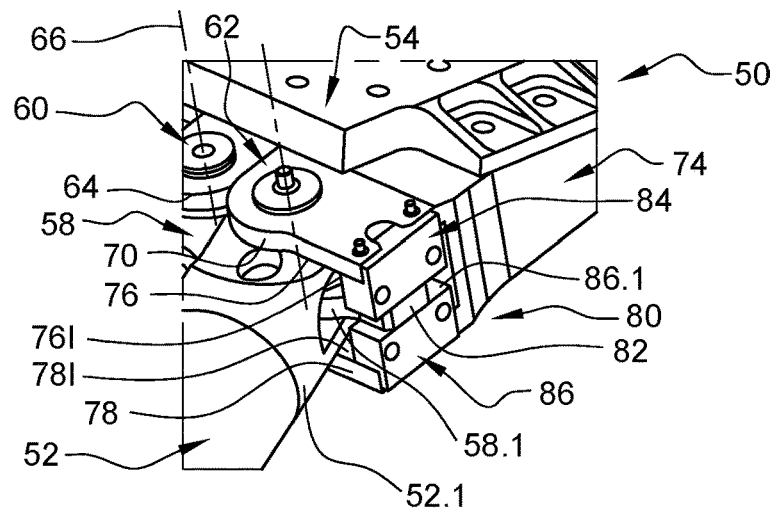
FIG. 7 is a perspective view of a linking device connecting thrust rods and a primary structure of an aircraft pylon, illustrating a second embodiment of the invention.
Figure 8:
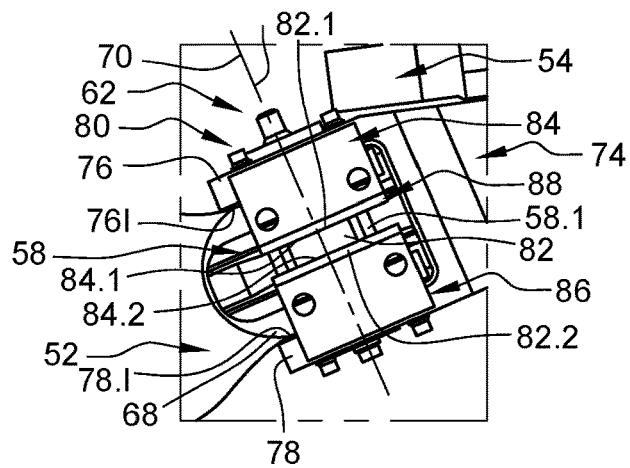
FIG. 8 is a lateral view of a linking device connecting a thrust rod and a primary structure of an aircraft pylon, illustrating the second embodiment.
Figure 12:
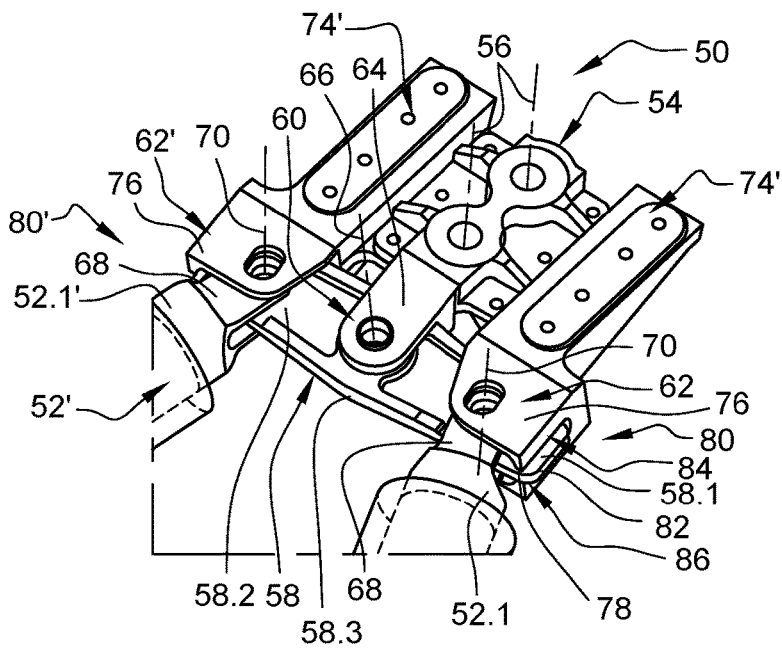
FIG. 12 is a perspective view of a linking device connecting thrust rods and a primary structure of an aircraft pylon, illustrating a third embodiment of the invention.

FIGS. 4, 7 and 12 show a linking device 50 connecting an engine and a primary structure of an aircraft pylon (not shown).

This linking device 50 comprises:

a support 54 (also called a beam) connected to the primary structure by linking elements 56 (shown schematically by axis lines), a spreader 58, which extends between first and second ends 58.1, 58.2, having a central part 58.3 connected to the support 54 by a principal link 60, a first thrust rod 52 that has a first end 52.1 connected to the first end 58.1 of the spreader 58 by a first secondary link 62 and a second end connected to the engine, and a second thrust rod 52' that has a first end 52.1' connected to the second end 58.2 of the spreader 58 by a second secondary link 62' and a second end connected to the engine.

The principal link 60 comprises a principal yoke 64 connected to the support 54 and a principal rotation axis 66 (shown schematically by an axis line) supported by the principal yoke 64 and traversing a principal orifice traversing the spreader 58.

The spreader 58 is in the form of a plate positioned in a plane perpendicular to the principal rotation axis 66.

Each of the first and second secondary links 62, 62' comprises a secondary yoke 68, provided at each of the rear ends 52.1, 52.1' of the rods 52, 52', and a secondary rotation axis 70 (shown schematically by an axis line) supported by the secondary yoke 68 and accommodated in an orifice 72 traversing the spreader 58, provided at each of the first and second ends 58.1, 58.2 of the spreader 58.

The linking device 50 has a plane of symmetry Ps passing via the principal rotation axis 66.

The first and second rods 52, 52', the secondary links 62, 62', the spreader 58, the principal link 60 and the support 54 define two primary thrust paths.

The linking device 50 also comprises first and second fittings 74, 74', secured to the support 54, arranged on either side of the principal yoke 64 in a symmetrical manner relative to the plane of symmetry Ps. Each of the first and second fittings 74, 74' comprises an upper branch 76 and a lower branch 78, between which the spreader 58 is positioned. The first and second ends 58.1, 58.2 are arranged on either side of the secondary yoke 68 provided at each of the rear ends 52.1, 52.1' of the rods 52, 52', each of the upper and lower branches 76, 78 comprising an oblong hole 76.1, 78.1 (visible, notably, in FIG. 6) configured such as to accommodate the ends of the secondary rotation axes 70.

In the event of failure of one of the first or second thrust rods 52, 52', the fitting 74, 74' located in the extension of the weak rod limits the movements of rotation about the principal rotation axis 66 generated by the remaining rod. Thus, the fittings 74, 74' define secondary thrust paths.

The first and second thrust rods 52, 52', the support 54, the spreader 58, the principal link 60 and the first and second secondary links 62, 62' are not described in further detail as they may be identical to those of the prior art.

Irrespective of the embodiment, the linking device 50 generates a deflection of the spreader 58 that is able to pivot about a deflection rotation axis R contained in the plane of symmetry Ps and perpendicular to the principal rotation axis 66.

According to one feature of the invention, the linking device 50 comprises at least one system 80 for limiting the deflection of the spreader 58. According to one configuration, the linking device 50 comprises first and second limiting systems 80, 80' respectively for the first and second ends 58.1, 58.2 of the spreader 58.

For each of the first and second ends 58.1, 58.2 of the spreader 58, the limiting system 80 comprises an extension 82 secured to the end 58.1, 58.2 of the spreader 58, projecting from the secondary yoke 68 accommodating the end 58.1, 58.2 of the spreader 58, and also upper and lower stops 84, 86 secured to the first or second fitting 74, 74', between which the extension 82 is positioned.

According to one configuration, the sum of the distances between the upper stop 84 and the extension 82 and also between the lower stop 86 and the extension 82 is substantially less than or equal to 0.3 mm.

Each extension 82 comprises an upper face 82.1 oriented towards the upper stop 84 and a lower face 82.2 oriented towards the lower stop 86. The upper and lower faces 82.1, 82.2 are parallel and planar.

Each upper or lower stop 84, 86 comprises a contact face 84.1, 86.1, which is substantially planar, against which the extension 82 is able to bear. The contact faces 84.1, 86.1 of the upper and lower stops 84, 86 are parallel relative to one another.

Figure 11:
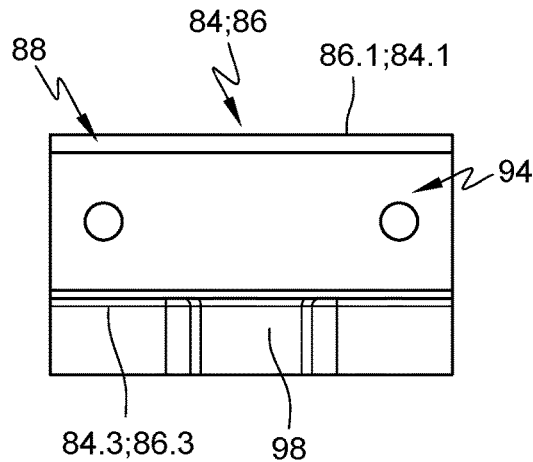
FIG. 11 is a lateral view of the stop that can be seen in FIG. 10.

According to one embodiment that can be seen in FIG. 11, at least one of the contact faces 84.1, 86.1 comprises a shock-absorbing covering 88 configured such as to damp the contact between one of the upper and lower stops 84, 86 and the extension 82. By way of example, the shock-absorbing covering 88 comprises cylindrical elements in the form of metallic sponges.

Figure 5:
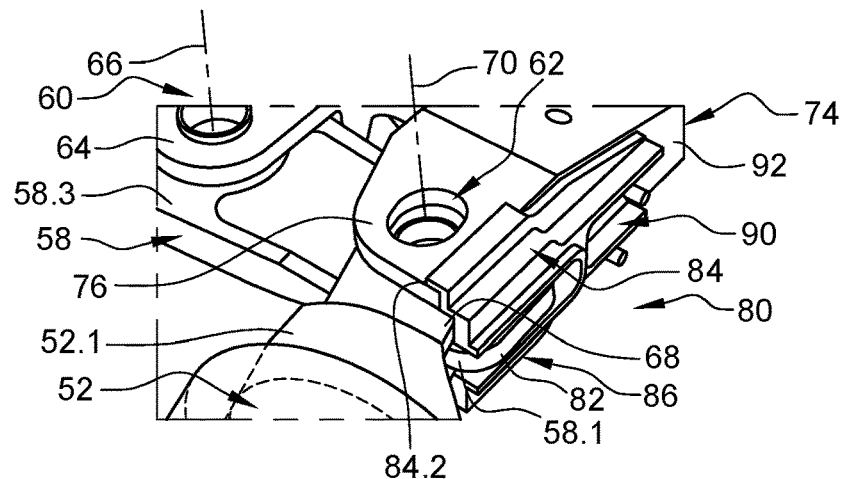
FIG. 5 is a perspective view of a linking device connecting a thrust rod and a fitting, illustrating, in detail, the first embodiment of the invention.
Figure 6:
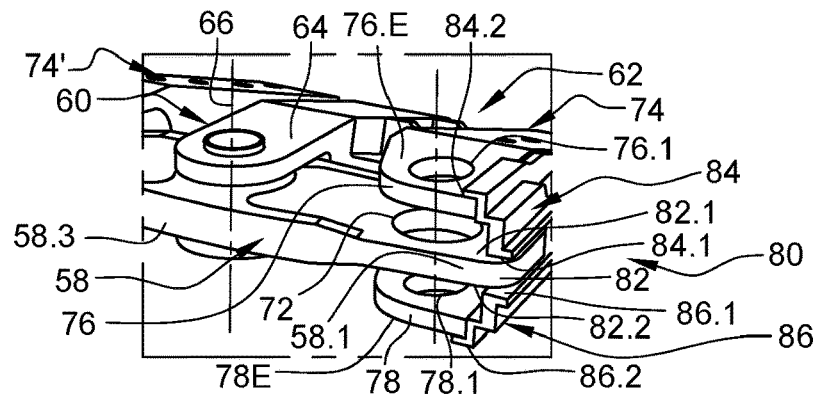
FIG. 6 is a perspective view of a fitting and of a spreader, illustrating the first embodiment of the invention.

According to a first embodiment that can be seen in FIGS. 4 to 6, for each system 80 for limiting the deflection, the upper and lower stops 84, 86 are out-of-joint with the fitting 74, 74'. Each device 80 for limiting the deflection comprises a plate 90, placed and fixed against a lateral face 92 of the fitting 74, 74', to which the upper and lower stops 84, 86 are connected. The upper and lower stops 84, 86 and also the plate 90 form a component made as a single piece in the form of a Y, the upper and lower stops 84, 86 forming the branches of the Y shape and the plate 90 forming the foot of the Y shape.

The upper stop 84 comprises a first flange 84.2 configured such as to be placed against the exterior face 76E of the upper branch 76 of the fitting 74, 74' and the lower stop 86 comprises a second flange 86.2 configured such as to be placed against the exterior face 78E of the lower branch 78 of the fitting 74, 74', as illustrated in FIG. 6.

According to a second embodiment that can be seen in FIGS. 7 to 11, for each system 80 for limiting the deflection, the upper and lower stops 84, 86 are out-of-joint with the fitting 74, 74' and independent of one another. According to this second embodiment, for each fitting 74, 74' the upper stop 84 is connected to the upper branch 76 of the fitting 74, 74' and the lower stop 86 is connected to the lower branch 78 of the fitting 74, 74'.

Figure 9:
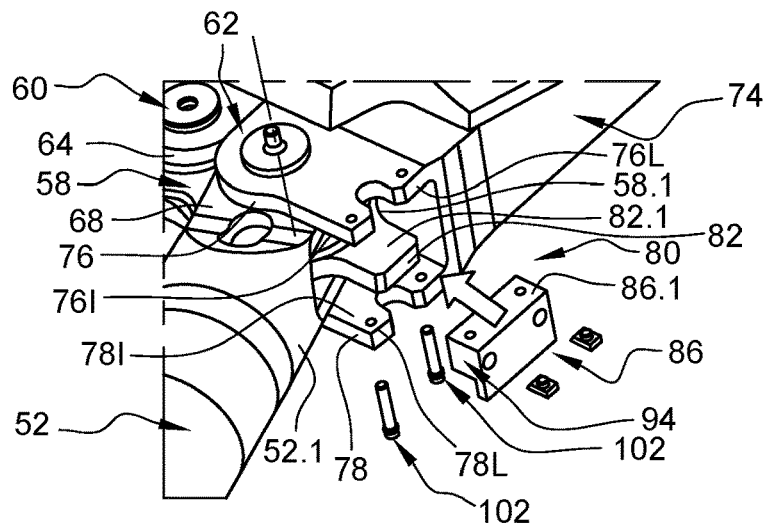
FIG. 9 is a perspective view of a linking device connecting thrust rods and a primary structure of an aircraft pylon, in the dismantled state, illustrating the second embodiment of the invention.
Figure 10:
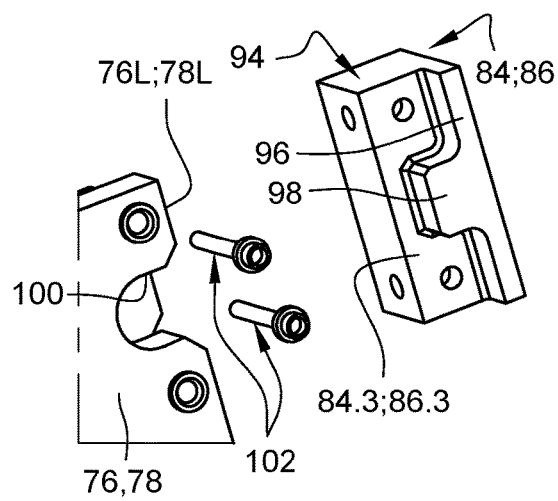
FIG. 10 is a perspective view of a stop and of a fitting, in the dismantled state, illustrating the second embodiment.

According to one embodiment that can be seen in FIGS. 9 to 11, each upper or lower stop 84, 86 comprises a parallelepipedal body 94 that has a first face corresponding to the contact face 84.1, 86.1 and a second face 84.3, 86.3, parallel to the first face, configured such as to be placed against the interior face 76I or 78I of the upper or lower branch 76, 78. Each upper or lower stop 84, 86 comprises a flange 96, made of a single piece with the body 94, configured such as to be placed against the lateral face 76L, 78L of the upper or lower branch 76, 78.

According to the second embodiment, as illustrated in FIGS. 10 and 11, the flange 96 comprises a stud 98 configured such as to interact with a notch 100 provided at the lateral face 76L, 78L of the upper or lower branch 76, 78 in such a manner as to immobilize the stud 98 in terms of translational movement relative to the notch 100.

According to this second embodiment, each upper or lower stop 84, 86 is connected to the upper or lower branch 76, 78 by two linking elements 102, such as, for example, a screw and a barrel-shaped nut.

Figure 13:
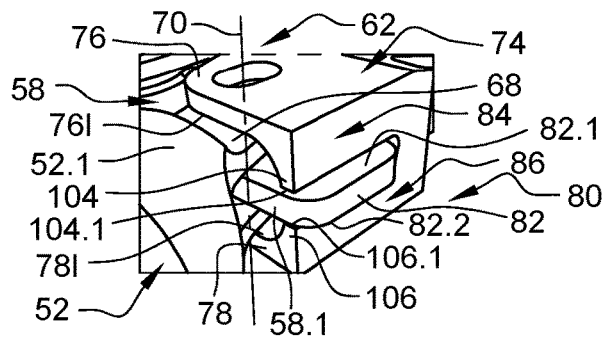
FIG. 13 is a perspective view of a fitting and of a spreader, illustrating, in detail, the third embodiment of the invention.

According to a third embodiment that can be seen in FIGS. 12 and 13, for each system 80 for limiting the deflection, the upper stop 84 is integrated into the upper branch 76 of the fitting 74, 74' and the lower stop 86 is integrated into the lower branch 78 of the fitting 74, 74'. According to this third embodiment, the upper branch 76 comprises an upper flange 104 projecting from the interior face 76I of the upper branch 76, the upper flange 104 comprising an interior face 104.1 that corresponds to the contact face 84.1 of the upper stop 84. The lower branch 78 comprises a lower flange 106 projecting from the interior face 78I of the lower branch 78, the lower flange 106 comprising an interior face 106.1 that corresponds to the contact face 86.1 of the lower stop 86.

The limiting systems 80 make it possible to enhance the out-of-plane rigidity of the spreader 58 and to obtain a decoupling of certain natural modes of the primary thrust paths and of the engine frequencies.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A linking device connecting an aircraft engine and a primary structure of an aircraft pylon, comprising:
   a support connected to the primary structure,
   a spreader, extending between first and second ends, that has a central part connected to the support by a principal link comprising a principal rotation axis,
   a first thrust rod comprising a first end connected to the first end of the spreader by a first secondary link and a second end connected to the engine,
   a second thrust rod comprising a first end connected to the second end of the spreader by a second secondary link and a second end connected to the engine,
   first and second fittings, secured to the support, comprising upper and lower branches, between which the spreader is positioned,
   the linking device generating a deflection of the spreader that is configured to pivot about a deflection rotation axis perpendicular to the principal rotation axis and contained in a plane of symmetry passing via the principal rotation axis,
   wherein the linking device comprises at least one system for limiting the deflection of the spreader comprising an extension secured to the spreader and also upper and lower stops, secured to the first or second fitting, between which the extension is positioned.

2. The linking device according to claim 1, wherein the at least one system for limiting the deflection of the spreader is configured such that a sum of distances between the upper stop and the extension and also between the lower stop and the extension is less than or equal to 0.3 mm.

3. The linking device according to claim 1, wherein the linking device comprises first and second systems for limiting the deflection of the spreader which are secured, respectively, to the first and second fittings.

4. The linking device according to claim 1, wherein each upper or lower stop comprises a contact face against which the extension is configured to bear, at least one of the contact faces comprising a shock-absorbing covering.

5. The linking device according to claim 1,
wherein, for each system for limiting the deflection, the upper and lower stops are out-of-joint with the fitting, and
wherein each device for limiting the deflection comprises a plate, fixed to the fitting, to which the upper and lower stops are connected.

6. The linking device according to claim 5, wherein the upper stop comprises a first flange placed against an exterior face of the upper branch of the fitting and wherein the lower stop comprises a second flange configured such as to be placed against an exterior face of the lower branch of the fitting.

7. The linking device according to claim 1, wherein, for each system for limiting the deflection, the upper and lower stops are out-of-joint with the fitting and independent of one another, the upper stop being connected to the upper branch of the fitting and the lower stop being connected to the lower branch of the fitting.

8. The linking device according to claim 7, wherein each upper or lower stop comprises:
a body that has a first face forming a contact face against which the extension is able to bear and a second face, parallel to the first face, placed against an interior face of the upper or lower branch of the fitting, and
a flange made as a single piece with the body, placed against a lateral face of the upper or lower branch of the fitting.

9. The linking device according to claim 8, wherein the flange comprises a stud interacting with a notch provided at the lateral face of the upper or lower branch of the fitting.

10. The linking device according to claim 1, wherein, for each system for limiting the deflection, the upper stop is integrated into the upper branch of the fitting and the lower stop is integrated into the lower branch of the fitting.

11. The linking device according to claim 10, wherein the upper branch comprises an upper flange, projecting from an interior face of the upper branch, which has an interior face against which the extension is able to bear and wherein the lower branch comprises a lower flange, projecting from an interior face of the lower branch, which has an interior face against which the extension is able to bear.

12. An aircraft comprising a linking device according to claim 1.

* * * * *